US009448573B2

United States Patent
Lee et al.

(10) Patent No.: US 9,448,573 B2
(45) Date of Patent: Sep. 20, 2016

(54) DC-DC CONVERTER CONTROL CIRCUIT, IMAGE DISPLAY DEVICE USING THE SAME AND DRIVING METHOD THEREOF

(71) Applicants: LG Display Co., Ltd., Seoul (KR); POSTECH ACADEMY-INDUSTRY FOUNDATION, Pohang-si, Gyeongsangbuk-do (KR)

(72) Inventors: Kyung-Min Lee, Daejeon (KR); Joung-Woo Lee, Seoul (KR); Bong-Koo Kang, Pohang-si (KR); Chang-Hyun Sung, Daegu (KR); Ho-Young Yoon, Ansan-si (KR)

(73) Assignees: LG Display Co., Ltd., Seoul (KR); Postech Academy-Industry Foundation, Pohang-Si, Gyeongbuk (KR)

( * ) Notice: Subject to any disclaimer, the term of this patent is extended or adjusted under 35 U.S.C. 154(b) by 135 days.

(21) Appl. No.: 13/724,795

(22) Filed: Dec. 21, 2012

(65) Prior Publication Data

US 2014/0092075 A1    Apr. 3, 2014

(30) Foreign Application Priority Data

Sep. 28, 2012 (KR) .......................... 10-2012-0108906

(51) Int. Cl.
*G05F 1/46* (2006.01)
*G09G 3/36* (2006.01)
(Continued)

(52) U.S. Cl.
CPC ............. *G05F 1/468* (2013.01); *G09G 3/3406* (2013.01); *G09G 3/3696* (2013.01); *G09G 2320/064* (2013.01); *G09G 2330/02* (2013.01); *H02M 2001/0035* (2013.01); *Y02B 70/16* (2013.01)

(58) Field of Classification Search
CPC ......... H05B 33/0815; H05B 33/0851; H02M 3/156; H02M 3/33507; H02M 3/33523; H02M 2001/0003; H02M 2001/0032; H02M 2001/0035; H02M 3/335; H04B 10/802

USPC ....... 345/102, 211, 212; 323/282; 315/185 R
See application file for complete search history.

(56) References Cited

U.S. PATENT DOCUMENTS 6,496,395 B2* 12/2002 Tokunaga ......... H02M 3/33592
363/21.06
7,068,020 B2*  6/2006 Inagawa ............... H02M 3/156
323/282
(Continued)

FOREIGN PATENT DOCUMENTS

CN          1407701        4/2003
CN          1860671       11/2006
(Continued)

OTHER PUBLICATIONS

Korean Intellectual Property Office, Office Action, Korean Patent Application No. 10-2012-0108906, Apr. 23, 2014, five pages [with concise explanation of relevancy in English].
(Continued)

Primary Examiner — Matthew Fry
(74) Attorney, Agent, or Firm — Fenwick & West LLP

(57) ABSTRACT

A DC-DC converter control circuit with enhanced driving efficiency while securing circuit stability during light-load driving of the DC-DC converter through variation of an on/off duty ratio of a burst mode according to load. The control circuit includes a detection unit for detecting an amount of current and a voltage at an output stage of a DC-DC converter, and generating and outputting a differential voltage according to a level of the detected voltage, a comparison unit for comparing the differential voltage with a reference voltage having a triangle or sawtooth waveform, thereby generating a duty signal, and a converter controller for generating an on/off control signal corresponding to a duty ratio of the duty signal, and supplying the on/off control signal to the DC-DC converter, to control on/off of the DC-DC converter.

3 Claims, 5 Drawing Sheets

(51) Int. Cl.
*G09G 3/34* (2006.01)
*H02M 1/00* (2006.01)

(56) References Cited

U.S. PATENT DOCUMENTS

| | | | | |
|---|---|---|---|---|
| 8,520,415 | B1* | 8/2013 | Krishnamoorthy | H02M 3/33523 363/21.07 |
| 9,271,365 | B2* | 2/2016 | Shibata | H05B 33/0851 |
| 2002/0027786 | A1* | 3/2002 | Nakazawa | H02M 3/33507 363/21.05 |
| 2003/0039129 | A1* | 2/2003 | Miyazaki | H02M 3/33576 363/26 |
| 2004/0042239 | A1* | 3/2004 | Kitano | H02M 3/33523 363/49 |
| 2005/0269997 | A1* | 12/2005 | Usui | H02M 1/4225 323/207 |
| 2006/0171180 | A1* | 8/2006 | Kyono | H02M 3/33592 363/95 |
| 2007/0152604 | A1* | 7/2007 | Tatsumi | H05B 33/0815 315/247 |
| 2008/0074058 | A1* | 3/2008 | Lee | H05B 33/0815 315/291 |
| 2008/0297499 | A1* | 12/2008 | Chang | H02M 5/4585 345/212 |
| 2009/0237007 | A1* | 9/2009 | Leng | H05B 33/0815 315/297 |
| 2010/0109537 | A1* | 5/2010 | Nishino | H05B 33/0827 315/185 R |
| 2010/0219764 | A1* | 9/2010 | Yamasaki | H05B 33/0851 315/224 |
| 2011/0069095 | A1* | 3/2011 | Kim | G09G 3/342 345/690 |
| 2012/0068614 | A1* | 3/2012 | Ng et al. | 315/185 R |
| 2012/0147631 | A1* | 6/2012 | Nate | H02M 3/33507 363/21.15 |
| 2015/0131332 | A1* | 5/2015 | Lee | H02M 3/33523 363/21.01 |

FOREIGN PATENT DOCUMENTS

| | | |
|---|---|---|
| CN | 101529983 | 9/2009 |
| CN | 101836505 | 9/2010 |
| JP | H 3-124774 | 12/1991 |
| JP | H08-294273 A | 11/1996 |
| JP | 2004-239888 A | 8/2004 |
| JP | 2010-066743 A | 3/2010 |
| JP | 2011-078188 A | 4/2011 |
| KR | 10-2010-0078322 | 7/2010 |

OTHER PUBLICATIONS

Japan Patent Office, Office Action, Japanese Patent Application No. 2012-278829, Oct. 14, 2014, three pages [with concise explanation of relevance in English].
Office Action for Chinese Patent Application No. CN 201210581655.3, Jul. 27, 2015, 17 Pages.
Office Action for Chinese Patent Application No. CN 201210581655.3, Mar. 28, 2016, 26 Pages.

* cited by examiner

DC-DC CONVERTER CONTROL CIRCUIT, IMAGE DISPLAY DEVICE USING THE SAME AND DRIVING METHOD THEREOF

CROSS-REFERENCE TO RELATED APPLICATION

This application claims the benefit of priority to Korean Patent Application No. 10-2012-0108906, filed on Sep. 28, 2012 which is hereby incorporated by reference as if fully set forth herein.

BACKGROUND OF THE INVENTION

1. Field of the Invention

The present invention relates to a DC-DC converter control circuit capable of achieving an enhanced driving efficiency while securing circuit stability during light-load driving of the DC-DC converter through variation of an on/off duty ratio of a burst mode according to load, and an image display device using the DC-DC converter control circuit and a driving method thereof.

2. Discussion of the Related Art

Generally, a DC-DC converter functions to output a specific constant voltage upon receiving a constant voltage input. Such a DC-DC converter has characteristics in that the driving efficiency thereof is varied in accordance with load conditions of an output stage.

That is, the driving efficiency of the DC-DC converter is increased under high-power heavy-load driving conditions, whereas the driving efficiency is decreased under light-load driving conditions. Such characteristics are exhibited due to voltage loss generated during switching operations of switches. In particular, under light-load driving conditions, the DC-DC converter is greatly influenced by switching voltage loss, so that driving efficiency is further decreased.

In order to solve the above-mentioned problem, in conventional cases, an error amplifier is used. That is, the error amplifier detects the load at the output stage of the DC-DC converter. When the detected load is light load equal to or less than reference load, a burst mode is carried out to turn off the DC-DC converter.

In the conventional load detection system using the error amplifier, however, the on/off reference of the DC-DC converter is varied in accordance with the load at the output stage of the DC-DC converter. Furthermore, variation of the on/off reference is great. For this reason, it is impossible to easily control the on/off timing of the DC-DC converter.

Also, when the DC-DC converter is turned on or off in a burst mode, the driving efficiency thereof is varied in accordance with variation in load at the output stage of the DC-DC converter and an output frequency band of the DC-DC converter. In the conventional system for driving the DC-DC converter in the burst mode, however, it is impossible to control the on/off duty ratio meeting the load or frequency band at the output stage. For this reason, system efficiency is low.

SUMMARY OF THE INVENTION

Accordingly, the present invention is directed to a DC-DC converter control circuit, an image display device using the same and a driving method thereof that substantially obviate one or more problems due to limitations and disadvantages of the related art.

An object of the present invention is to provide a DC-DC converter control circuit capable of achieving an enhancement in driving efficiency of a DC-DC converter while securing circuit stability during light-load driving of the DC-DC converter through variation of an on/off duty ratio of a burst mode according to load, and an image display device using the DC-DC converter control circuit and a driving method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a DC-DC converter control circuit includes a detection unit for detecting an amount of current and a voltage at an output stage of a DC-DC converter, and generating and outputting a differential voltage according to a level of the detected voltage, a comparison unit for comparing the differential voltage from the detection unit with a reference voltage having a triangle waveform or a sawtooth waveform, thereby generating a duty signal, and a converter controller for generating an on/off control signal corresponding to a duty ratio of the duty signal, and supplying the on/off control signal to the DC-DC converter, to control on/off of the DC-DC converter.

The detection unit may include a detection resistor connected to the output stage of the DC-DC converter in series, and a differential amplifier for detecting and amplifying a voltage difference across the detection resistor, thereby generating the differential voltage.

The comparison unit may include a comparator for comparing the differential voltage from the detection unit with the triangle-wave or sawtooth-wave reference voltage, thereby generating the duty signal, and a switching transistor turned on or off in accordance with the duty signal from the comparator.

The converter controller may include at least one photocoupler including a photodiode connected between a high-level voltage source and the switching transistor, and a bipolar junction transistor provided to correspond to the photodiode.

In another aspect of the present invention, an image display device includes an image display panel having a plurality of pixel regions, to display an image, gate and data drivers for driving the image display panel, a timing controller for aligning image data input from outside, supplying the aligned image data to the data driver, and generating a dimming control signal and gate and data control signals, to control the gate and data drivers, a backlight unit for controlling turn-on and off times of a backlight, the backlight unit including the DC-DC converter control circuit as described above, to control on/off states of a DC-DC converter internally provided in the backlight unit.

In another aspect of the present invention, a driving method of a DC-DC converter control circuit includes the steps of detecting an amount of current and a voltage at an output stage of a DC-DC converter, and generating and outputting a differential voltage according to a level of the detected voltage, by a detection unit, comparing the differential voltage from the detection unit with a reference voltage having a triangle waveform or a sawtooth waveform, thereby generating a duty signal, by a comparison unit, and generating an on/off control signal corresponding to a duty ratio of the duty signal, and supplying the on/off control signal to the DC-DC converter, by a converter controller, to control on/off of the DC-DC converter.

The step of generating and outputting the differential voltage may include the step of detecting and amplifying a voltage difference across a detection resistor connected to the output stage of the DC-DC converter in series, thereby generating the differential voltage, by a differential amplifier.

The step of generating the duty signal may include the steps of comparing the differential voltage from the detection unit with the triangle-wave or sawtooth-wave reference voltage, thereby generating the duty signal, by a comparator, and turning on or off a switching transistor in accordance with the duty signal.

The step of controlling on/off of the DC-DC converter may include the step of supplying the on/off control signal to the DC-DC converter by at least one photocoupler including a photodiode connected between a high-level voltage source and the switching transistor, and a bipolar junction transistor provided to correspond to the photodiode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Reference will now be made in detail to the preferred embodiments of the present invention associated with a DC-DC converter control circuit and an image display device using the same and a driving method thereof, examples of which are illustrated in the accompanying drawings.

Figure 1:
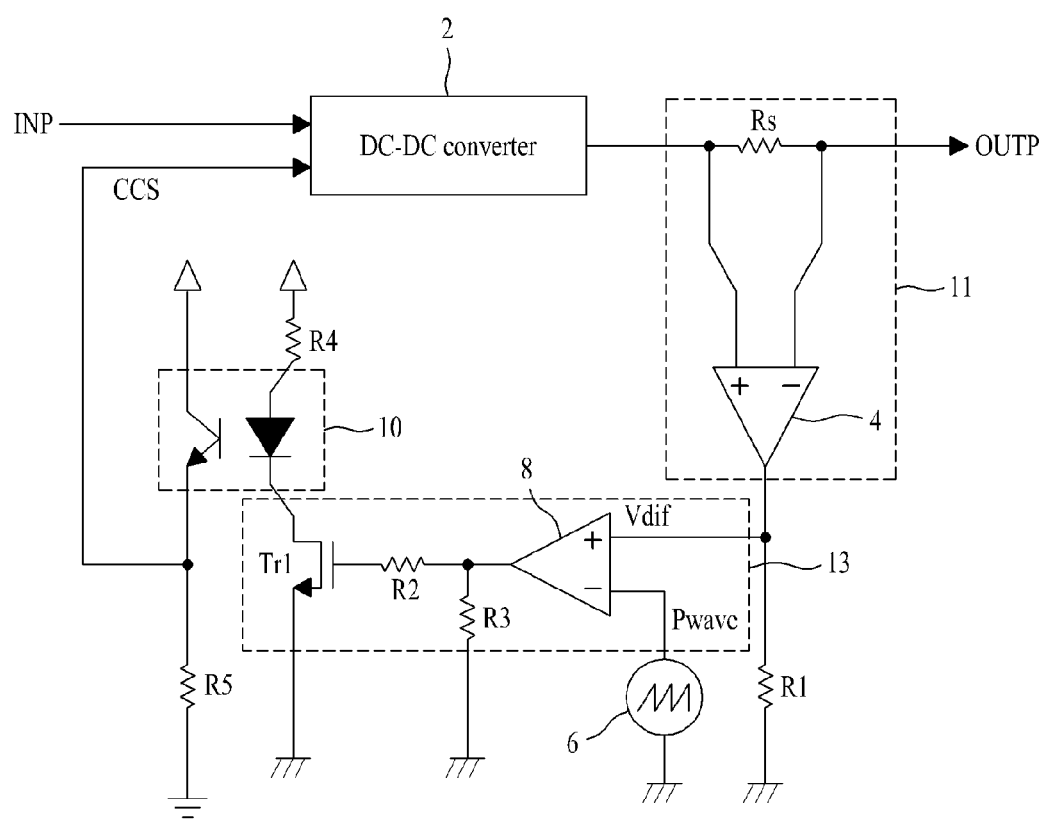
FIG. 1 is a circuit diagram illustrating a DC-DC converter control circuit according to an exemplary embodiment of the present invention.

FIG. 1 is a circuit diagram illustrating a DC-DC converter control circuit according to an exemplary embodiment of the present invention. The DC-DC converter control circuit shown in FIG. 1 includes a detection unit 11 for detecting an amount of current and a voltage at an output stage of a DC-DC converter 2, and generating and outputting a differential voltage Vdif according to the level of the detected voltage, and a comparison unit 13 for comparing the differential voltage Vdif from the detection unit 11 with a reference voltage Pwave having a triangle waveform or a sawtooth waveform, thereby generating a duty signal Duty. The DC-DC converter control circuit also includes a converter controller 10 for generating an on/off control signal CCS corresponding to the duty ratio of the duty signal Duty, and supplying the on/off control signal CCS to the DC-DC converter 2, to control on/off of the DC-DC converter 2.

For detection of the current amount and voltage at the output stage of the DC-DC converter 2, the detection unit 11 includes a detection resistor Rs connected to the output stage of the DC-DC converter 2 in series, and a differential amplifier 4 for detecting and amplifying a voltage difference across the detection resistor Rs, thereby generating a differential voltage Vdif.

In order to detect variation in current amount and variation in voltage at the output stage of the DC-DC converter 2, the detection resistor Rs is connected to the output stage of the DC-DC converter 2 in series. If the resistance of the detection resistor Rs is excessively great, as compared to the current amount and voltage at the output stage, there may be problems of heat generation and reduced efficiency. In this regard, the resistance of the detection resistor Rs is preferably set to a low value having no influence on driving of the DC-DC converter 2.

The differential amplifier 4 receives the voltage difference across the detection resistor Rs in real time, and amplifies the voltage difference, to generate and output the differential voltage Vdif.

The comparison unit 13 compares the differential voltage Vdif from the detection unit 11 with the reference voltage Pwave, which is generated from the comparison unit 13 or input from outside. Based on the result of comparison, the comparison unit 13 outputs the duty signal Duty. For this function, the comparison unit 13 includes a comparator 8 for comparing the differential voltage Vdif from the detection unit 11 with the reference voltage Pwave, which has a triangle waveform or a sawtooth waveform, thereby generating the duty signal Duty, and a switching transistor Tr1 turned on or off in accordance with the duty signal Duty from the comparator 8.

The comparison unit 13 includes a triangle wave generator 6, to generate the reference voltage Pwave, which has a triangle waveform or a sawtooth waveform. The differential voltage Vdif is compared with the reference voltage Pwave by the comparator 8. If the triangle wave generator 6 is not included in the comparison unit 13, the comparison unit 13 receives the triangle-wave or sawtooth-wave reference voltage Pwave from an external triangle wave generator, and then compares the differential voltage Vdif with the reference voltage Pwave. Then, the comparator 8 outputs the duty signal Duty, based on the result of the comparison between the differential voltage Vdif from the detection unit 11 and the reference voltage Pwave from outside.

The switching transistor Tr1 includes a gate terminal connected to an output terminal of the comparator 8, from which the duty signal Duty is output, a drain terminal connected to a high-level voltage output node of the converter controller 10, and a source terminal connected to a low-level voltage terminal. In accordance with the duty signal Duty from the comparator 8 input to the gate terminal, the switching transistor Tr1 is turned on or off, to control high-level voltage output of the converter controller 10. As the switching transistor Tr1, an NMOS or PMOS transistor may be employed. When a PMOS transistor is employed, the source terminal thereof is connected to the high-level voltage output node of the converter controller 10, and the drain terminal thereof is connected to the low-level voltage terminal.

The comparison unit 13 and the converter controller 10 operate in a separate manner in accordance with the configuration in which the duty signal Duty from the comparator 8 is used to switch the switching transistor Tr1 without being directly supplied to the converter controller 10, that is, the configuration in which the converter controller 10 is driven in accordance with the switching operation of the switching transistor Tr1. Accordingly, it is possible to secure driving reliability of the comparison unit 13 and converter controller 10.

The converter controller 10, which controls on/off of the DC-DC converter 2, includes at least one photocoupler. The photocoupler is driven in accordance with the switching operation of the switching transistor Tr1 included in the comparison unit 13, to generate and output the on/off control signal CCS, which corresponds to the duty ratio of the duty signal Duty. That is, a photodiode of the photocoupler is controlled in accordance with an on/off operation of the switching transistor Tr1 in the comparison unit 13. In accordance with operation of the photodiode, a bipolar junction transistor (BJT) of the photocoupler is turned on or off and, as such, the on/off control signal CCS swinging between a high voltage level and a low voltage level is output.

The DC-DC converter 2 is controlled to be turned on or off in response to the on/off control signal CCS from the converter controller 10. Meanwhile, at least one resistor is provided at each of the output terminal of the detection unit 11, the output terminal of the comparator 8, and the input and output terminals of the converter controller 10, to stabilize the entire circuit. In the illustrated case, resistors R1 to R5 are provided.

Figure 2A:
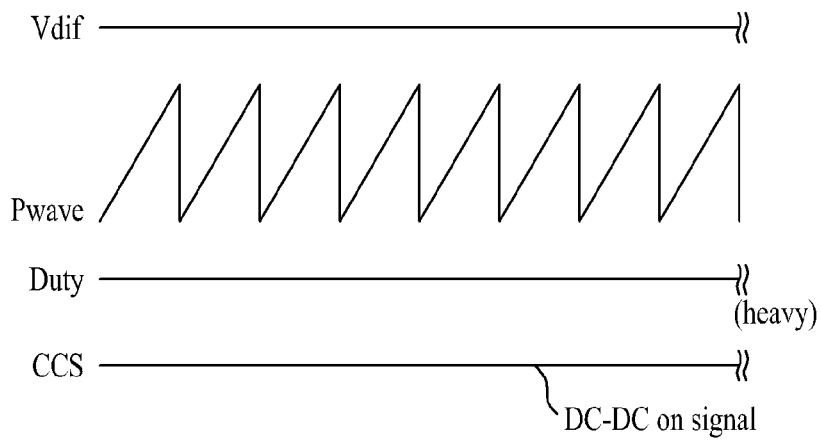
FIGS. 2A to 2C are waveform diagrams of input and output signals of the DC-DC converter control circuit shown in FIG. 1.
Figure 2B:
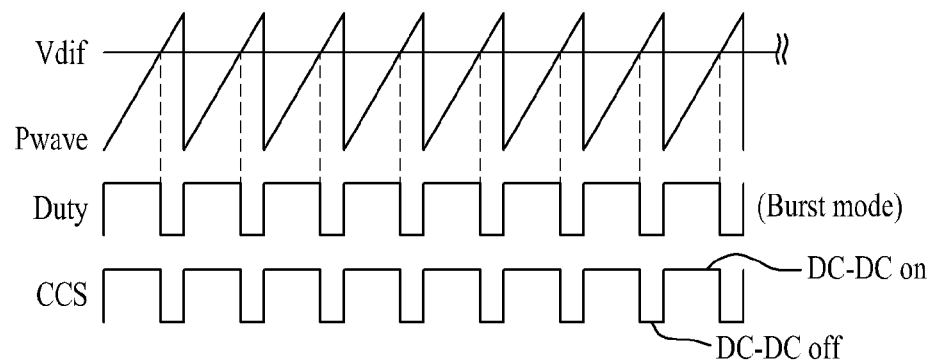
Figure 2C:
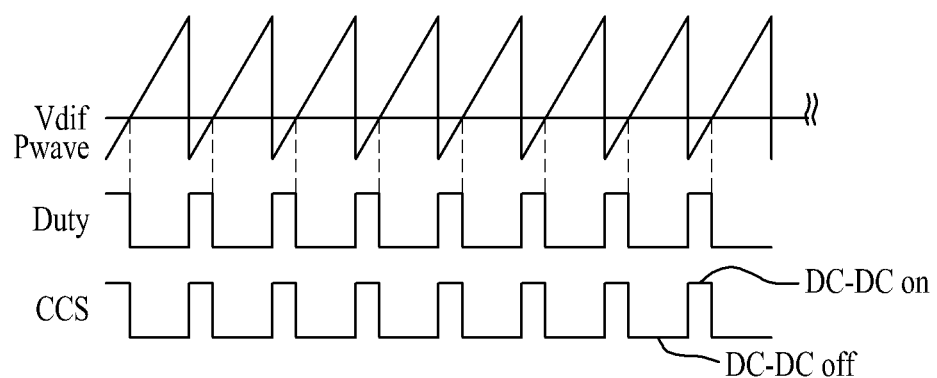

FIGS. 2A to 2C are waveform diagrams of input and output signals of the DC-DC converter control circuit shown in FIG. 1. FIG. 2A shows input and output signals for driving the DC-DC converter 2 under heavy load conditions. Under heavy load conditions, the DC-DC converter 2 is not driven in a burst mode, but is driven in a normal mode because the differential signal Vdif detected at the output stage of the DC-DC converter 2 is higher than the reference voltage Pwave having a sawtooth waveform.

In detail, the differential voltage Vdif (generated by the detection unit 11 in accordance with amplification of the voltage difference across the detection resistor Rs at the output stage of the DC-DC converter 2) is compared with the sawtooth-wave reference voltage Pwave by the comparison unit 13. When it is determined that the differential voltage Vdif is higher than the reference voltage Pwave continuously, the comparison unit 13 outputs a duty signal Duty maintaining a first logic level (high logic level). That is, when the duty signal Duty from the comparator 8 is maintained in a first logic state, namely, a high logic state, the switching transistor Tr1 is maintained in a turned-on state. In this case, both the photodiode and BJT of the photocoupler 10 are also maintained at an ON state. As a result, an on/off control signal CCS, which causes the DC-DC converter 2 to be maintained is output at a turned-on state.

When the differential signal Vdif detected at the output stage of the DC-DC converter 2 is maintained at a higher level than the reference voltage Pwave, this state is determined as a heaviest load driving condition. In this case, the DC-DC converter 2 is controlled to be driven in the normal mode. When the DC-DC converter 2 is driven under the heavy-load driving condition, it is unnecessary to operate the DC-DC converter 2 in the a burst mode because high driving efficiency and high accuracy are obtained.

FIG. 2B shows input and output signals in the case in which the DC-DC converter 2 is driven under light load conditions, and the output load under light load conditions approximates the output load under heavy load conditions. If the differential signal Vdif is higher than the sawtooth-wave reference voltage Pwave for a shorter time, the DC-DC converter 2 is driven in a high-duty burst mode.

In detail, when the differential signal Vdif generated from the detection unit 11 is higher than the sawtooth-wave reference voltage Pwave, the comparison unit 13 outputs a duty signal Duty that is maintained in a first logic (high logic) for a shorter time. That is, when the duty signal Duty from the comparator 8 is maintained in the high logic state for a longer time, the switching transistor Tr1 operates at a high duty, causing the switching transistor Tr1 to be maintained at a turned-on state for a longer time (the burst mode is maintained at a higher duty ratio). In this case, both the photodiode and BJT of the photocoupler 10 are also turned on or off at a high duty such that the turned-on state is maintained for a longer time. As a result, an on/off control signal CCS also causes the DC-DC converter 2 to be maintained in a turned-on state for a longer time.

If the time period indicating higher differential signal Vdif (generated from the detection unit 11) compared to the sawtooth-wave reference voltage Pwave is longer, this is a light-load driving condition. In this case, the DC-DC converter 2 is driven in a burst mode at a higher duty ratio causing the DC-DC converter 2 to be maintained in an ON state for a shorter time. When the DC-DC converter 2 is driven under light load conditions, the driving efficiency thereof is reduced. However, the reduction in driving efficiency under light load conditions occurs in a differential manner in accordance with load. To this end, it is necessary to adjust the driving efficiency of the DC-DC converter 2 in a differential manner in accordance with load.

FIG. 2C shows input and output signals in the case in which the DC-DC converter 2 is driven under light load conditions, and the output load under light load conditions approximates the lightest output load. When the differential signal Vdif is higher than the sawtooth-wave reference voltage Pwave for a longer time, the DC-DC converter 2 is driven in a low-duty burst mode.

In detail, when differential signal Vdif generated from the detection unit 11 is higher than the sawtooth-wave reference voltage Pwave for a shorter time, the comparison unit 13 outputs a duty signal Duty that is maintained in a first logic (high logic) state for a shorter time. That is, when the duty signal Duty from the comparator 8 is maintained in a low logic state for a longer time, the switching transistor Tr1 operates at a low duty state, causing the switching transistor Tr1 to be maintained in a turned-off state for a longer time (the burst mode is maintained at a lower duty ratio). In this case, both the photodiode and BJT of the photocoupler 10 are also turned on and off at a low duty state such that the turned-off state is maintained for a longer time. As a result, an on/off control signal CCS, which causes the DC-DC converter 2 to be maintained in a turned-off state for a longer time, is output.

When the rate that the differential signal Vdif generated from the detection unit 11 remains lower than the sawtooth-wave reference voltage Pwave, this state indicates the lightest-load driving condition. In this case, the DC-DC converter 2 is driven in a burst mode at a lower duty ratio in which the DC-DC converter 2 is maintained in an OFF state for a longer time. When the DC-DC converter 2 is driven under the lightest-load condition, the driving efficiency thereof is remarkably reduced. For this reason, it is necessary to still further enhance the driving efficiency of the DC-DC converter 2 when the load under light load conditions is still further reduced.

When the DC-DC converter 2 is driven in the burst mode, the driving efficiency or ripple voltage thereof may be varied in accordance with a burst frequency. In particular, at a lower burst frequency, the driving efficiency enhancement rate is high, but ripple of the voltage at the output stage is increased. On the other hand, at a higher burst frequency, the output voltage is stabilized, but the driving efficiency enhancement rate is relatively low. Therefore, it is necessary to set a most efficient reference frequency (a triangle-wave or sawtooth-wave reference frequency generated through a triangle wave generator), taking into consideration the driving efficiency and burst frequency of the DC-DC converter 2.

Meanwhile, when the burst driving duty of the DC-DC converter 2 is high, the turned-on time of the DC-DC converter 2 is long, thereby increasing switching loss. In this case, accordingly, the driving efficiency enhancement rate is reduced. On the other hand, when the burst driving duty of the DC-DC converter 2 is low, the turned-on time of the DC-DC converter 2 is short, thereby reducing switching loss. In this case, accordingly, the driving efficiency enhancement rate is increased.

In this regard, it is necessary to set the on/off duty or the duty of the triangle wave or sawtooth wave generated through the triangle wave generator within an allowable range of a ripple voltage in the burst mode. That is, at a relatively high load, it is necessary to increase the duty of the burst mode so as to minimize the ripple voltage because an increase in ripple may occur during the turned-off time. On the other hand, at a relatively low load, it is necessary to reduce the duty of the burst mode so as to increase the driving efficiency enhancement rate because ripple is reduced.

In the DC-DC converter control circuit according to the illustrated embodiment of the present invention, which has various technical features as described above, and an image display device using the DC-DC converter control circuit and a driving method thereof, it is possible to achieve an optimum efficiency enhancement in the burst mode when the DC-DC converter is driven in the burst mode under light load conditions, by increasing the duty ratio when the load under light load conditions is relatively high while reducing the duty ratio when the load under light load conditions is relatively low such that the duty ratio is still further reduced when the load under light load conditions is still further reduced. In particular, it is possible to achieve an enhancement in driving efficiency during light-load driving of the DC-DC converter while securing circuit stability by varying the on/off duty ratio of the burst mode in accordance with load.

In addition, it is possible to easily vary the on/off duty ratio of the DC-DC converter by varying the frequency of the sawtooth wave, which is a reference for comparison with the load at the output stage of the DC-DC converter. Also, it is possible to solve noise problems occurring during driving of the DC-DC converter in the burst mode by optimizing the frequency. Also, it is possible to safely protect the control circuit from electrical stress by electrically insulating the output stage of the DC-DC converter and the on/off control signal generation circuit by a photocoupler.

Figure 3:
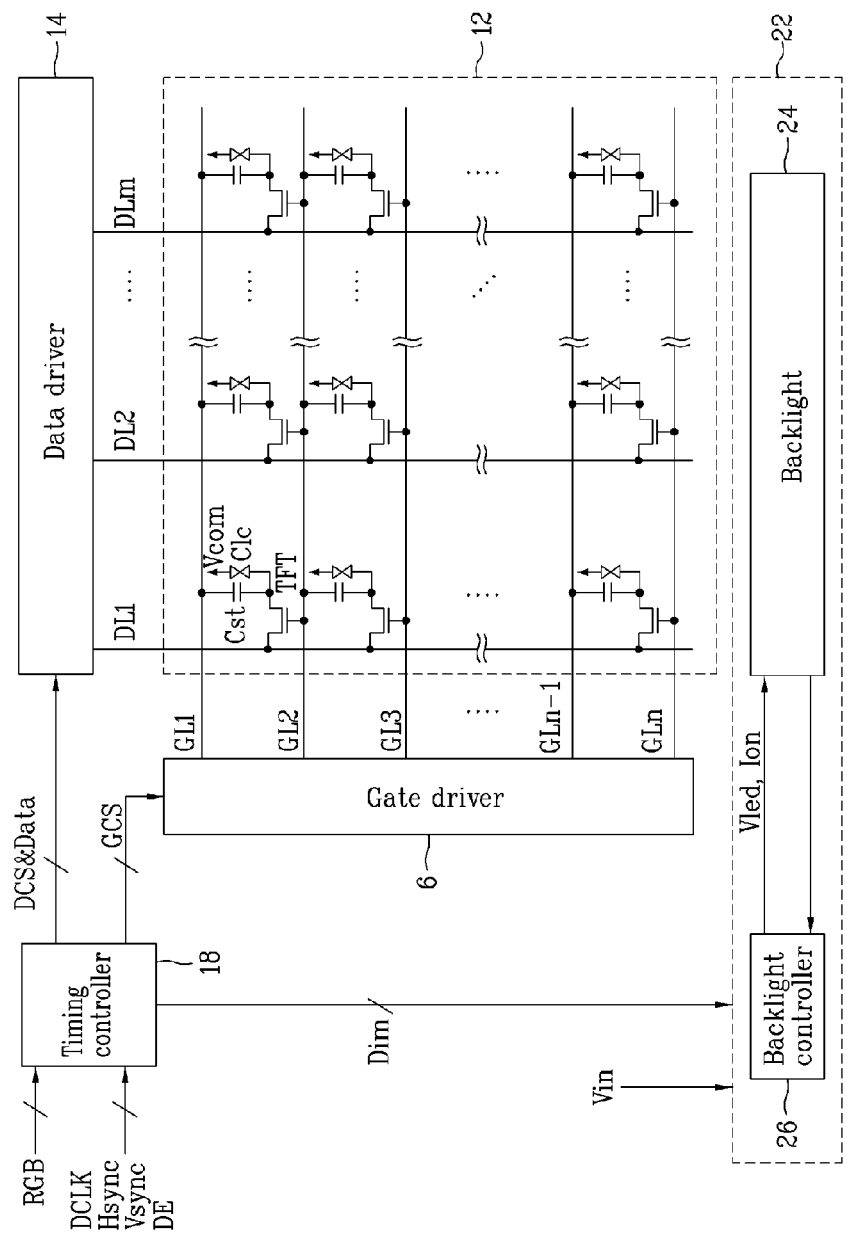
FIG. 3 is a diagram illustrating a configuration of a liquid crystal display device including the DC-DC converter control circuit shown in FIG. 1 and FIGS. 2A to 2C.

FIG. 3 is a diagram illustrating a configuration of a liquid crystal display device including the DC-DC converter control circuit shown in FIGS. 1 and 2A to 2C.

The DC-DC converter control circuit shown in FIG. 1 may be applied to various image display devices such as a liquid crystal display device, an organic light emitting diode display device, a field emission display device and a plasma display panel. For convenience of description, however, the following description will be given in conjunction with an example in which the DC-DC converter control circuit according to the present invention is applied to a liquid crystal display device.

The liquid crystal display device shown in FIG. 3 includes a liquid crystal panel 12 having a plurality of pixel regions, a data driver 14 for driving data lines DL1 to DLm of the liquid crystal panel 12, a gate driver 16 for driving gate lines GL1 to GLn of the liquid crystal panel 12, and a timing controller 18 for aligning image data RGB input from outside, supplying the aligned image data RGB to the data driver 14, and generating a dimming control signal Dim and gate and data control signals GCS and DCS, to control the gate and data drivers 16 and 14. The liquid crystal display device also includes a backlight unit 22 for controlling turn-on and off times of a backlight 24. The backlight unit 22 includes the DC-DC converter control circuit shown in FIG. 1, to internally control on/off states of the DC-DC converter.

The liquid crystal panel 12 includes thin film transistors (TFTs) respectively formed at the pixel regions, which are defined by the plural gate lines GL1 to GLn and the plural data lines DL1 to DLm, and liquid crystal capacitors C1c respectively connected to the TFTs. Each liquid crystal capacitor C1c includes a pixel electrode connected to the corresponding TFT, and a common electrode facing the pixel electrode in a state in which liquid crystals are interposed between the common electrode and the pixel electrode. Each TFT supplies an image signal from a corresponding one of the data lines DL1 to DLm to the corresponding pixel electrode in response to a scan pulse from a corresponding one of the gate lines GL1 to GLn. Each liquid crystal capacitor C1c is charged with a difference voltage between the image signal supplied to the pixel electrode of the liquid crystal capacitor C1c and a common voltage supplied to the common electrode of the liquid crystal capacitor C1c. The liquid crystal capacitor C1c varies the molecular alignment of the liquid crystals in accordance with the difference voltage, to adjust light transmittance of the liquid crystals and thus to render a desired grayscale. A storage capacitor Cst is connected to each liquid crystal capacitor C1c in parallel, to sustain the voltage charged in the liquid crystal capacitor C1c until a next data signal is supplied.

The data driver 14 converts data Data output from the timing controller 18 into an analog voltage, namely, an image signal, using data signals DCS from the timing controller 18, for example, a source start pulse (SSP), a source shift clock (SSC), and a source output enable (SOE) signal. In this case, the data driver 14 selects a positive or negative gamma voltage having a level corresponding to the grayscale value of the aligned input image data Data, and supplies the selected gamma voltage to the data lines DL1 to DLm, as an image signal.

The gate driver 16 sequentially generates scan pulses in response to gate control signals GCS from the timing controller 18, for example, a gate start pulse (GSP), a gate shift clock (GSC), and a gate output enable (GOE) signal, and sequentially supplies the scan pulses to respective gate lines GL1 to GLn.

The timing controller 18 aligns the image data RGB input from outside, to match driving of the liquid crystal panel 12, and supplies the aligned image data Data to the data driver 14 by a unit of at least one horizontal line. The timing controller 18 also generates the gate and data control signals GCS and DCS, using at least one of synchronization signals input from outside, namely, a dot clock DCLK, a data enable signal DE, a horizontal synchronization signal Hsync, and a vertical synchronization signal Vsync, and supplies the generated gate and data control signals GCS and DCS to the gate and data drivers 6 and 4, respectively, to control the gate and data drivers 6 and 4. In addition, the timing controller 18 generates a dimming control signal Dim by use of at least one of the synchronization signals in accordance with brightness or luminance information of the aligned image data Data, and supplies the dimming control signal Dim to the backlight unit 22, to control the backlight unit 22.

The backlight unit 22 includes the backlight 24, which includes a plurality of light emitting diode (LED) arrays to generate light, and optics for enhancing the efficiency of light incident from the LED arrays. The backlight unit 22 also includes a backlight controller 26 for generating a control current Icon and a control voltage Vled in accordance with the dimming control signal Dim from the timing controller 18, to control the turn-on and off times of the backlight 24.

The plurality of LED arrays included in the backlight 24 are connected in series or in parallel. LEDs of each LED array are simultaneously or sequentially turned on/off by the control voltage Vled supplied to the LED array, to generate light.

The backlight controller 26 sets the turn-on and off times of the backlight 14, namely, each LED array, for every frame period in accordance with the dimming control signal Dim from outside or the timing controller 18, to control an amount of light emitted from the LED array. In detail, the backlight controller 26 generates a pulse width modulation (PWM) signal corresponding to a duty ratio of the dimming control signal Dim input from outside or the timing controller 18, using at least one control IC. The backlight controller 26 also controls the LED control circuit Icon of the backlight 24 in accordance with the PWM signal, using a DC-DC converter provided to correspond to the control IC. Here, the PWM signal is a signal for varying the ON/OFF times of each LED array, for example, high/low times of each LED array, in accordance with the duty ratio information of the dimming control signal Dim. Accordingly, the at least one control IC and DC-DC converter included in the backlight controller 26 controls each LED array to be driven in a burst mode by controlling the time when the LED control current for the backlight 24 is output in accordance with the PWM signal.

Figure 4:
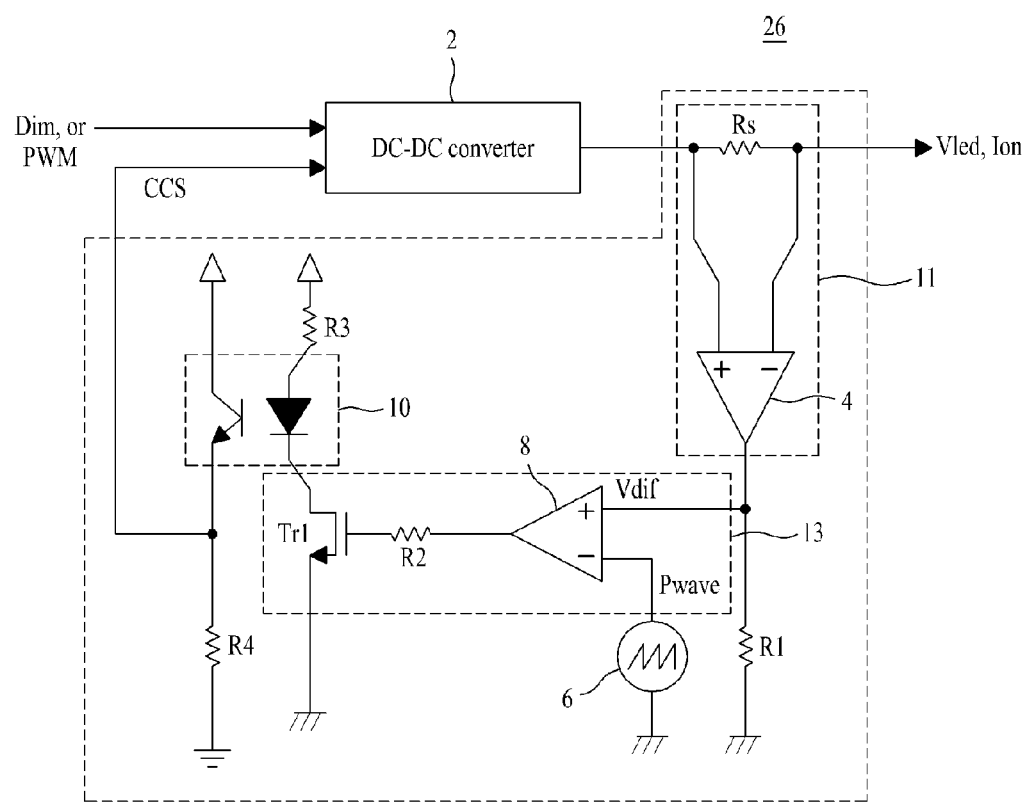
FIG. 4 is a circuit diagram illustrating a detailed configuration of a backlight controller shown in FIG. 3.

FIG. 4 is a circuit diagram illustrating a detailed configuration of the backlight controller shown in FIG. 3. The backlight controller 26 of FIG. 4 includes at least one control IC (not shown) for generating and outputting a PWM signal corresponding to a dimming control signal Dim, and a DC-DC converter 2 for outputting an LED control current and an LED control voltage for the backlight 14 in accordance with the PWM signal input from the control IC. The backlight controller 26 also includes a DC-DC converter control circuit for detecting an amount of current and a voltage at an output stage of the DC-DC converter 2, and comparing the result of the detection with a reference voltage Pwave having a triangle waveform or a sawtooth waveform, thereby generating a duty signal Duty, to control on/off of the DC-DC converter 2.

In detail, the DC-DC converter control circuit of FIG. 4 includes a detection unit 11 for detecting an amount of current and a voltage at the output stage of the DC-DC converter 2, and generating and outputting a differential voltage Vdif according to the level of the detected voltage, and a comparison unit 13 for comparing the differential voltage Vdif from the detection unit 11 with a reference voltage Pwave having a triangle waveform or a sawtooth waveform, thereby generating a duty signal Duty. The DC-DC converter control circuit also includes a converter controller 10 for generating an on/off control signal CCS corresponding to the duty ratio of the duty signal Duty, and supplying the on/off control signal CCS to the DC-DC converter 2, to control on/off of the DC-DC converter 2.

The DC-DC converter control circuit of FIG. 4 may be a DC-DC converter control circuit described with reference to FIG. 1 and FIGS. 2A to 2C and, as such, descriptions of the configuration of the DC-DC converter control circuit and a driving method thereof may refer to the descriptions given with reference to FIG. 1 and FIGS. 2A to 2C.

The detection unit 11 of the DC-DC converter control circuit of FIG. 4 includes a detection resistor Rs connected to the output stage of the DC-DC converter 2 in series, and a differential amplifier 4 for detecting and amplifying a voltage difference across the detection resistor Rs, thereby generating a differential voltage Vdif.

The comparison unit 13 includes a comparator 8 for comparing the differential voltage Vdif from the detection unit 11 with the reference voltage Pwave, which has a triangle waveform or a sawtooth waveform, thereby generating the duty signal Duty, and a switching transistor Tr1 turned on or off in accordance with the duty signal Duty from the comparator 8.

The converter controller 10, which controls on/off of the DC-DC converter 2, includes at least one photocoupler. The photocoupler is driven in accordance with the switching operation of the switching transistor Tr1 included in the comparison unit 13, to generate and output the on/off control signal CCS, which corresponds to the duty ratio of the duty signal Duty.

Then, the DC-DC converter 2 is controlled to be turned on or off in response to the on/off control signal CCS from the converter controller 10.

As apparent from the above description, in the DC-DC converter control circuit according to the illustrated embodiment of the present invention, which has various technical features as described above, and an image display device using the DC-DC converter control circuit and a driving method thereof, it is possible to achieve an optimum efficiency enhancement in the burst mode when the DC-DC converter is driven in the burst mode under light load conditions, by relatively increasing the duty ratio when the load under light load conditions is relatively high while relatively reducing the duty ratio when the load under light load conditions is relatively low such that the duty ratio is still further reduced when the load under light load conditions is still further reduced. In particular, it is possible to achieve an enhancement in driving efficiency during light-load driving of the DC-DC converter while securing circuit stability by varying the on/off duty ratio of the burst mode in accordance with load.

In addition, it is possible to easily vary the on/off duty ratio of the DC-DC converter by varying the frequency of the sawtooth wave, which is a reference for comparison with the load at the output stage of the DC-DC converter. Also, it is possible to solve noise problems occurring during driving of the DC-DC converter in the burst mode by optimizing the frequency. Also, it is possible to safely protect the control circuit from electrical stress by electrically insulating the output stage of the DC-DC converter and the on/off control signal generation circuit by a photocoupler.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A DC-DC converter control circuit comprising:
a detection unit for generating an amplified version of a voltage across a detection resistor at an output stage of a DC-DC converter configured to receive a pulse width modulation (PWM) signal and an on/off control signal separate from the PWM signal, the DC-DC converter configured to output a constant control voltage based on the PWM signal in a burst mode when the DC-DC converter is turned on, the amplified version of the voltage across the detection resistor representing a load condition of the DC-DC converter, wherein the detection unit comprises:
the detection resistor connected to the output stage of the DC-DC converter in series, and
an amplifier having a first input and a second input, the first input connected to one end of the detection resistor and the second input connected to another end of the detection resistor, the amplifier generating the amplified version of the voltage;
a waveform generator for generating a reference voltage signal having a triangle waveform or a sawtooth waveform, the reference voltage signal independent of the load condition of the DC-DC converter;
a comparison unit for receiving the amplified version of the voltage across the detection resistor and the reference voltage signal, the comparison unit further comparing the amplified version of the voltage with the reference voltage signal to generate an adjusted duty signal according to the load condition of the DC-DC converter, the comparison unit comprising:
a comparator for comparing the amplified version of the voltage with the reference voltage signal to generate the adjusted duty signal, and
a switching transistor turned on or off in accordance with the adjusted duty signal from the comparator; and
a converter controller for generating the on/off control signal corresponding to the adjusted duty signal and supplying the on/off control signal to the DC-DC converter to turn on or turn off the DC-DC converter.

2. The DC-DC converter control circuit according to claim 1, wherein the converter controller comprises:
at least one photocoupler comprising a photodiode connected between a high-level voltage source and the switching transistor, and a bipolar junction transistor provided to correspond to the photodiode.

3. An image display device comprising:
an image display panel having a plurality of pixel regions, to display an image;
gate and data drivers for driving the image display panel;
a timing controller for aligning image data input from outside, supplying the aligned image data to the data driver, and generating a dimming control signal and gate and data control signals, to control the gate and data drivers;
a backlight unit for controlling turn-on and off times of a backlight, the backlight unit comprising a DC-DC converter and a DC-DC converter control circuit coupled to the DC-DC converter to control on or off states of the DC-DC converter, the DC-DC converter configured to receive a pulse width modulation (PWM) signal and an on/off control signal separate from the PWM signal, the DC-DC converter configured to output a constant control voltage based on the PWM signal in a burst mode when the DC-DC converter is turned on, the DC-DC converter control circuit comprising:
a detection unit for generating an amplified version of a voltage across a detection resistor at an output stage of the DC-DC converter, the amplified version of the voltage across the detection resistor representing a load condition of the DC-DC converter, wherein the detection unit comprises:
the detection resistor connected to the output stage of the DC-DC converter in series, and
an amplifier having a first input and a second input, the first input connected to one end of the detection resistor and the second input connected to another end of the detection resistor, the amplifier generating the amplified version of the voltage;
a waveform generator for generating a reference voltage signal having a triangle waveform or a sawtooth waveform, the reference voltage signal independent of a load condition of the DC-DC converter;
a comparison unit for receiving the amplified version of the voltage across the detection resistor and the reference voltage signal, the comparison unit further comparing the amplified version of the voltage with the reference voltage signal to generate an adjusted duty signal according to the load condition of the DC-DC converter, the comparison unit comprising:
a comparator for comparing the amplified version of the voltage with the reference voltage signal to generate the adjusted duty signal, and
a switching transistor turned on or off in accordance with the adjusted duty signal from the comparator; and
a converter controller for generating the on/off control signal corresponding to the adjusted duty signal and supplying the on/off control signal to the DC-DC converter to turn on or turn off the DC-DC converter, the converter controller comprising a photodiode connected between a voltage source and the switching transistor.

* * * * *